(12) United States Patent
Nathan et al.

(10) Patent No.: US 7,965,170 B2
(45) Date of Patent: Jun. 21, 2011

(54) SUPERVISED AND UNSUPERVISED SEAT FOLDING

(75) Inventors: John F. Nathan, White Lake, MI (US); Karl Kennedy, Fraser, MI (US)

(73) Assignee: Lear Corporation, Southfield, MI (US)

( * ) Notice: Subject to any disclaimer, the term of this patent is extended or adjusted under 35 U.S.C. 154(b) by 1314 days.

(21) Appl. No.: 11/457,616

(22) Filed: Jul. 14, 2006

(65) Prior Publication Data
US 2008/0021618 A1 Jan. 24, 2008

(51) Int. Cl.
*G08B 29/00* (2006.01)
(52) U.S. Cl. ............... 340/5.1; 340/5.62; 701/49
(58) Field of Classification Search ............ 296/63, 296/65.05, 65.09, 24.43, 3; 340/5.1, 5.61, 340/5.72, 5.62, 825.69; 297/335, 257; 701/49; 180/271, 287, 272, 273; 280/226.1
See application file for complete search history.

(56) References Cited

U.S. PATENT DOCUMENTS

| | | | |
|---|---|---|---|
| 4,432,119 A | 2/1984 | Schwark et al. | |
| 6,130,606 A | 10/2000 | Flick | |
| 6,240,352 B1 | 5/2001 | McCurdy | |
| 6,573,673 B1 | 6/2003 | Hampel et al. | |
| 6,573,678 B2 * | 6/2003 | Losey et al. | 318/470 |
| 6,677,720 B2 * | 1/2004 | Fraser | 318/445 |
| 6,767,040 B1 | 7/2004 | Freijy | |
| 6,817,645 B2 | 11/2004 | Taguchi et al. | |
| 7,293,836 B2 * | 11/2007 | Browne et al. | 297/344.11 |
| 2002/0070591 A1 | 6/2002 | Nivet | |
| 2004/0195227 A1 * | 10/2004 | Park | 219/217 |
| 2004/0195892 A1 * | 10/2004 | Daniels | 297/378.1 |
| 2004/0226767 A1 * | 11/2004 | Martinez et al. | 180/268 |
| 2005/0017564 A1 | 1/2005 | Kayumi | |
| 2005/0057082 A1 | 3/2005 | Hatta et al. | |
| 2005/0168035 A1 * | 8/2005 | Boudinot | 297/378.1 |
| 2005/0236881 A1 | 10/2005 | Suda et al. | |
| 2007/0018840 A1 | 1/2007 | Nathan et al. | |

FOREIGN PATENT DOCUMENTS

| | | |
|---|---|---|
| DE | 10129177 A1 | 1/2002 |
| DE | 10203624 A1 | 8/2002 |
| DE | 102006022359 A1 | 1/2007 |
| DE | 102006025949 A1 | 3/2007 |
| EP | 1143089 A2 | 3/2001 |
| WO | 0014369 A2 | 3/2000 |

OTHER PUBLICATIONS

Search and Examination Report for corresponding Application No. GB0713499.2, mailed Nov. 13, 2007, 6 pages.

* cited by examiner

*Primary Examiner* — Daniel Wu
*Assistant Examiner* — Nay Tun
(74) *Attorney, Agent, or Firm* — Brooks Kushman P.C.

(57) ABSTRACT

Supervised and unsupervised seat folding of the type wherein supervised or unsupervised seating folding is permitted as function of whether a user is within a particular proximity to a seat being folded. The proximity being determined according to any number of parameters, such as but not limited whether the user is able to view the folding seat.

19 Claims, 2 Drawing Sheets

SUPERVISED AND UNSUPERVISED SEAT FOLDING

BACKGROUND OF THE INVENTION

1. Field of the Invention

The present invention relates to supervised and unsupervised seat folding, such as but not limited to vehicle system folding.

2. Background Art

Automobiles and other vehicles include any number of seating arrangements for supporting passengers. In some arrangements, the seats may be configured to fold down and/or fold forward. More and more seats are providing such functionality with electrically operable elements that automatically or otherwise fold the seat in response to some type of user input.

BRIEF SUMMARY OF THE INVENTION

One non-limiting aspect of the present invention relates to a method of folding a vehicle seat comprising: receiving a remotely transmitted request for seat folding from a key fob; determining a proximity of the key fob to the vehicle; permitting unsupervised seat folding if the key fob is within a first proximity to the vehicle; requiring supervised seat folding if the key fob is within a second proximity to the vehicle; requiring one-touch seat actuation if unsupervised seating folding is permitted and requiring continuous seat actuation if supervised seating folding is permitted; requiring continuous manual depression of an electrical switch used in supervised seat folding if continuous seat actuation is required; overriding unsupervised seat folding in response to determining an override event such that supervised seat folding is required in order to fold the vehicle seat between the first and second positions; and defining the override event according to stability logic associated with preventing successive seat foldings within a predefined period of time.

One non-limiting aspect of the present invention relates to determining the override event according to the stability logic associated with preventing successive seat foldings within the predefined period of time and a status of an obstruction sensor used to sense for obstructions on the vehicle seat.

One non-limiting aspect of the present invention relates to determining the override event according to the stability logic associated with preventing successive seat foldings within the predefined period of time and a status of a seat fold travel sensor used to sense movement of the vehicle seat.

One non-limiting aspect of the present invention relates to determining the override event according to the stability logic associated with preventing successive seat foldings within the predefined period of time and a status of a seat belt latch sensor used to sense engagement of a seat belt used to restrain a passenger relative to the vehicle seat.

One non-limiting aspect of the present invention relates to determining the override event according to the stability logic associated with preventing successive seat foldings within the predefined period of time and a status of a seat belt tension sensor used to sense tensioning on a seat belt used to restrain a passenger relative to the vehicle seat.

One non-limiting aspect of the present invention relates to the vehicle seat including a shape memory alloy (SMA) element configured to facilitate seat folding, and defining the override event according to the stability logic associated with preventing successive seat foldings within the predefined period of time and SMA protection logic used to protect operations of the SMA element.

One non-limiting aspect of the present invention relates to overriding the unsupervised seat folding according to SMA protection logic for thermal or electrical protection.

One non-limiting aspect of the present invention relates to remotely actuating a secondary seat element associated with the vehicle seat before permitting one-touch seat folding.

One non-limiting aspect of the present invention relates to the secondary seat element being a temperature exchange element associated with heating or cooling the vehicle seat, the temperature exchange element being attached to the vehicle seat, and shutting off the temperature exchange element before remotely actuating the secondary seat element.

One non-limiting aspect of the present invention relates to defining the first proximity to correspond with a distance sufficient to visually inspect the vehicle seat.

One non-limiting aspect of the present invention relates to a method of folding a vehicle seat comprising: instigating folding of the vehicle seat upon receipt of a request from a key fob; determining a proximity of the key fob used to request folding the vehicle seat based on a signal received from the key fob; disabling an override of the seat folding if the key fob is within a first proximity; and requiring continuous-touch of the key fob or a vehicle seat switch to disable the override of the seat folding if the key fob is beyond the first proximity.

One non-limiting aspect of the present invention relates to overriding seat folding in response to determining an override event, wherein the override event is defined according to stability logic associated which prevents successive seat foldings within a predefined period of time.

One non-limiting aspect of the present invention relates to the first distance being approximately three feet.

One non-limiting aspect of the present invention relates to determining the override in the event a sensor senses the vehicle seat to be occupied, the override preventing folding of the seat.

One non-limiting aspect of the present invention relates to a system for folding a vehicle seat comprising: a key fob having a button to request seat folding; a seat actuation element configured to: (i) facilitate folding the seat upon receiving signals indicating actuation of the button; (ii) detect an override event; (iii) override folding the seat upon detecting the override event unless one of the button is actuated while the key fob is within a first distance to the vehicle and the button is continuously actuated while the key fob is at a second distance, beyond the first distance to the vehicle; and wherein the seat actuation element requires receipt of a signal from the key fob in order to determine whether the key fob is at each of the first and second distances.

One non-limiting aspect of the present invention relates to the override event being defined according to stability logic associated with preventing successive seat foldings within a predefined period of time.

One non-limiting aspect of the present invention relates to a vehicle mounted seat switch and the seat actuation element being configured to permit seat folding if the override event is determined and the seat switch is used to instigate seat folding.

One non-limiting aspect of the present invention relates to determining the key fob to be within the first proximity if the key fob is within three feet of the vehicle.

One non-limiting aspect of the present invention relates to determining the key fob to be within the first proximity if the key fob is within five feet of a vehicle seat to be folded.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
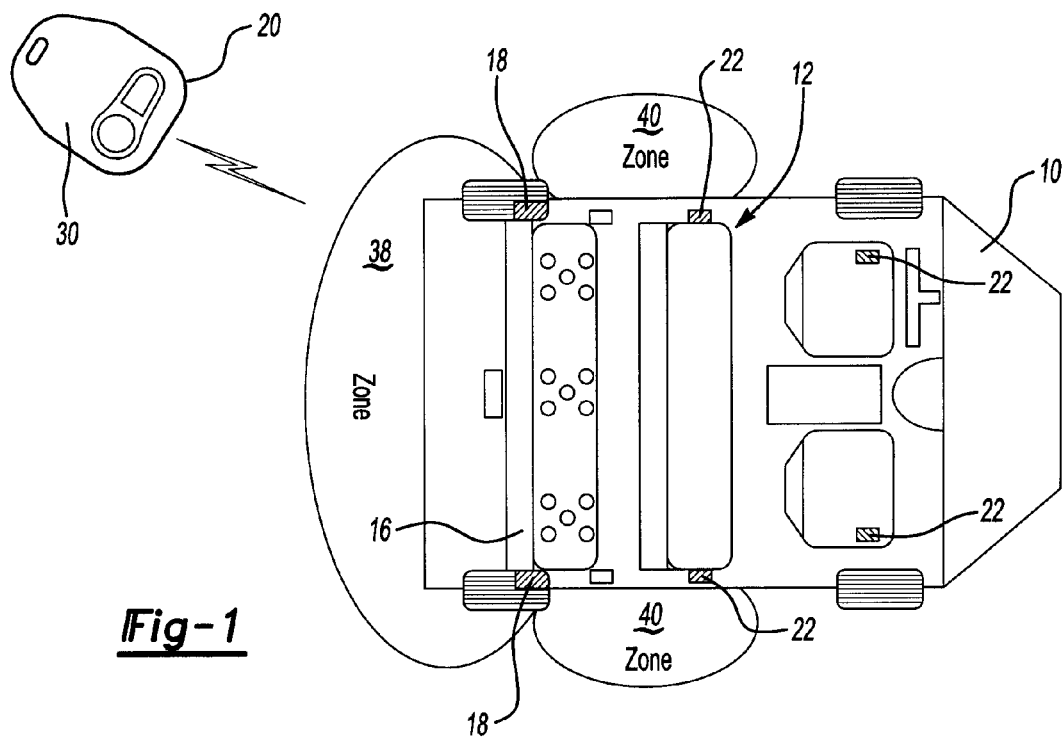
FIG. 1 illustrates a vehicle having a seat system in accordance with one non-limiting aspect of the present invention.

FIG. 1 illustrates a vehicle 10 having a seat system 12 in accordance with one non-limiting aspect of the present invention. The system 12 may include a foldable seat 16 and a seat actuation element 18. The actuation element 18 may be configured to interact with elements of the seat 16 so as to facilitate seat folding.

The seat 16 and seat actuation element 18 may include any number of features, devices, linkages, controllers, and other operable elements required to facilitate seat folding operations, such as those associated with U.S. patent application Ser. No. 11/472,203, entitled Seat Fold Actuator (the serial number was unavailable at the time of filing and will be added through amendment), the disclosure of which is hereby incorporated in its entirety.

The present invention, however, is not intended to be limited to vehicles and fully contemplates its application to any environment where it may be desirable to facilitate seat folding, such as but not limited watercraft, aircraft, non-vehicle seating, and the like. As such, the seat 16 and seat actuation element 18 may include any number of other elements and capabilities in order to facilitate seat folding operations in such other environments.

The seat actuation element 18 may be an electrically operable element in that may be configured to electrically execute or instigate seat folding in response to signals received from a key fob 20 and/or a seat switch 22. For example, the seat actuation element 18 may include a controller or other element (not shown) configured to receive signals from the aforementioned signal sources 20-22 and to electrically facilitate folding the seat 16 as a function thereof.

For example, the seat 16 may include springs, hydraulics, or other features controlled, instructed, or otherwise manipulated with electrical signals. The seat actuation element 18 may communicate with such electrically controllably elements so as to facilitate seat folding operations. The folding may occur from a use or upright position to a non-use or folded position, from the non-use or folded position to the use or upright position, and/or from or to any number of other positions, including positions dependent on the configurations and capabilities of the seat 16 and seat actuation element 18.

Optionally, the present invention contemplates the seat actuation element 18 having and/or communicating with an electrically excitable shape memory alloy (SMA) element configured to release, actuate, or otherwise instigate a mechanical folding element used to fold the seat, which may be associated with the seat and/or seat actuation element. Of course, any number of other electrically or partially electrically actuated folding arrangements may be used without deviating from the scope and contemplation of the present invention.

The fob 20 may be any type of element having capabilities to remotely communicate with the seat actuation element 18 or other element in communication therewith. The fob 20 my include a radio frequency, infrared, and other transmitter to facilitate remote communications with the vehicle.

The fob 20 may include buttons, touch-screens, or other user actuated features 30. These features may be associated with seat folding controls so that a user may remotely control seat folding operations, such as but not limited to control folding the seat up and down.

The seat switch 22 may be positioned locally on the vehicle in an area proximate to the seat 16, such as but not limited to a position within the vehicle from which the user thereof is able to view the seat 16 and elements or persons thereon or in close proximity thereto. Optionally, the seat switch may be positioned at other areas of the vehicle 10. The switch 22 may be actuated with a depressive force or other user triggerable actuation such that the user must be within arms reach or otherwise in contact with the switch 22 in order to electronically control seat folding.

The switch 22 may include buttons, touch-screens, or other user actuated features (not shown). These features may be associated with seat folding controls associated with the seat 16 and seat actuation element 18 such that a user may control seat folding operations, i.e., to control folding the seat up and down. Optionally, the vehicle may include multiple switches to facilitate seat folding from different areas of the vehicle 10.

In this manner, the seat system 12 of the present invention is able to facilitate remote and local seat folding operations with signals respectively emitted from the fob 20 and seat switch 22, such as but not limited to one-touch operations when the user simply selects one of the communication buttons or switches to begin seat folding. This allows the present invention to provide a convenient means for folding the seat 16 from distances within in arms reach of the vehicle and/or from a more distant, remote position.

Optionally, the seat system 12 may include additional seat related elements. The seat actuation element 18 may be configured to communicate with the additional seat related elements, and if necessary, facilitate controlling the same prior to executing seat folding operations. This may be helpful in preventing damage or other complications from arising during seat folding operations. This may include retracting or stowing seat mounted elements (DVD player, multimedia screen, etc.) or controlling non-seat mounted elements that may interfere with seat folding (armrest, trays, etc.).

For example, the seat 16 may include a temperature exchange element mounted to the seat and configured to heat and/or cool the seat. The temperature exchange element may be controlled with a vehicle system controller or other element. The seat actuation element 18 may communicate with the vehicle system controller and/or directly with the temperature exchange element in order to power off or otherwise shut-down its operation before executing a seat folding operation.

Figure 2:
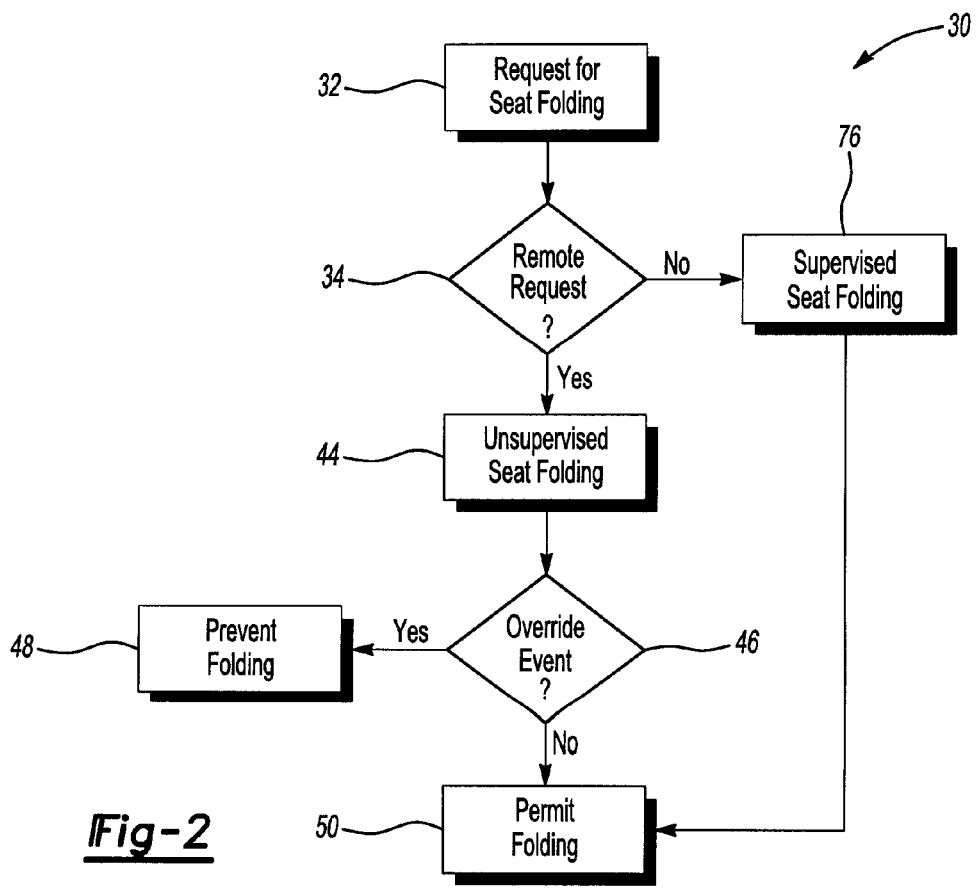
FIG. 2 illustrates a flowchart of a method of seat folding in accordance with one non-limiting aspect of the present invention.

FIG. 2 illustrates a flowchart 30 of a method of seat folding in accordance with one non-limiting aspect of the present invention. The method is described for exemplary purposes only with respect to folding the vehicle seat shown in FIG. 1. As noted above, the present invention is not so limit and fully contemplates its application with any number of folding seats, and not just vehicle seats.

Block 32 relates to determining a request for seat folding. The request may be received from the fob and/or seat switch. It may indicate any number of seat folding operations and/or specify particular seats for folding, such as if the vehicle includes multiple seats. The request may be processed by the seat actuation system or with some other element within the vehicle, such as but not limited to a vehicle system controller.

Block 34 relates to determining whether the request is from a remote location. The remote location may be defined according to any number of parameters, such as but not limited as a function of whether the request is received from the fob or seat switch. Optionally, additional parameters may be analyzed, such as whether the request is from a location from which the seat to be folded can be viewed. Requests form the fob may be presumed to be from locations or proximities beyond seat viewing and requests from the seat switch may be presumed to be from locations or proximities within seat viewing.

This inquiry may require some analysis of the signals communicated from the fob, such as but not limited to analysis associated with determining a proximity of the fob to the vehicle. The proximity may be determined and related to predefined proximities so as to assess whether the signals are from a remote location, i.e., beyond viewing of the seat or otherwise sufficient distance to make viewing of the seat questionable.

The proximity analysis may include analyzing other parameters of the signals, including but not limited to signal directionality. The signal directionality may be correlated with a position of the seat to be folded within the vehicle, distance of the fob to the vehicle, or other parameters in order to determine whether the signals are from remote locations, i.e., beyond viewing of the seat or otherwise sufficient distance to make viewing of the seat questionable.

Optionally, a number of zones 38-42 around the vehicle (see FIG. 1) may be established for fob related seat folding requests. The zones may be used to define particular areas relative to the vehicle outside of which the fob related requests are determined to be from remote locations. Of course, any number of zones may be used and the sizing thereof may be adjusted according to any number of parameters.

Block 44 relates to determining the seat folding request to be from a remote location, such as but not limited to a location whereby visibility of the seat may be in question or impossible. In response thereto, the seat actuation element may electronically control seat folding. Because the seat folding was instigated from a remote or non-viewable location, this type of seat folding may be characterized as unsupervised seat folding.

Block 46 relates to determining the occurrence of an override event. The override event may be associated with any event suitable to prevent seat folding or further seat folding, regardless off whether the seat folding is associated with putting the seat up or down. Block 48 relates to prevent seat folding if an override event is determined and Block 50 relates to permitting seat folding in the absence of an override event.

Figure 3:
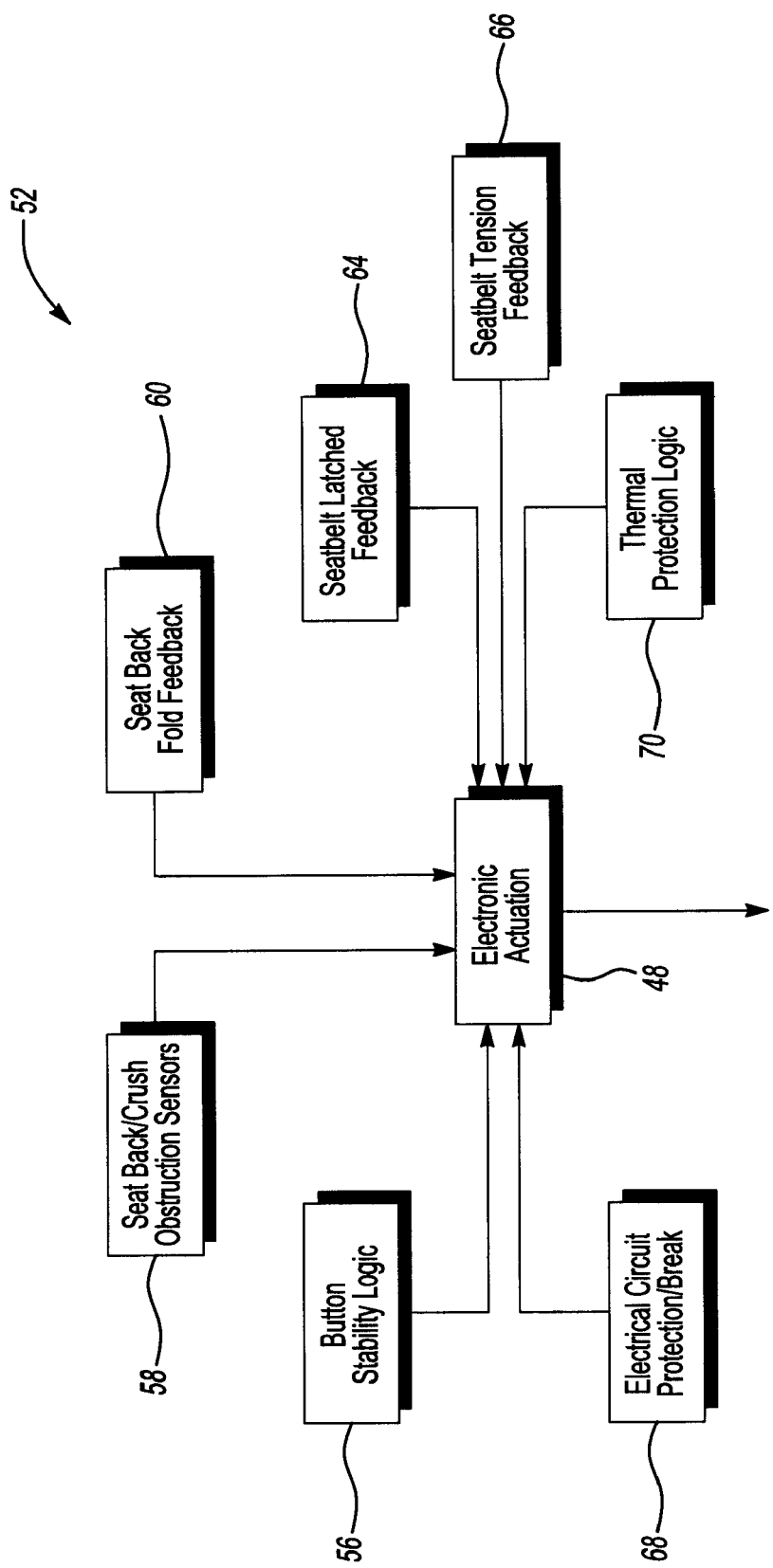
FIG. 3 illustrates a flowchart associated with a number of override events in accordance with one non-limiting aspect of the present invention.

The override event may be determined according to any number of operating parameters, variables, and features. FIG. 3 illustrates a flowchart 52 associated with a number of override events that may be used to override seat actuation at the override Block in accordance with one non-limiting aspect of the present invention. One or more of a number of events associate with Blocks 56-70 may be used to prevent seat folding or further seat folding.

One Block 56 may relate to defining the override event according to stability logic associated with preventing successive seat foldings within a predefined period of time. This may be helpful to prevent accidental folding caused by the user inadvertently pressing a folding button on the fob.

One Block 58 may relate to determining the override event according to a status of an obstruction or crush sensor used to sense for obstructions on the vehicle seat. The obstruction sensor may be any sensor suitable for detecting objects in proximity to the vehicle seat that may interfere with seat folding.

Block 58 may also relate to determining the override event according to a status of a crush sensor used to sense for crushed items on the vehicle seat. The crush sensor may be an sensor suitable for detecting objects on the seat that may be crushed or otherwise forced upon during seat fold, such as objects positioned on the seat base that may be crushed with folding of the seat back.

One Block 60 may relate to determining the override event according to a status of a seat fold travel sensor used to sense movement of the vehicle seat. The travel sensor may include infrared, RF, or other element to measure or sense positioning of the seat and the suitability of that position to permit seat folding, such as but not limited to position of the seat within a seat track.

One Block 64 may relate to determining the override event according to a status of a seat belt latch sensor used to sense engagement of a seat belt used to restrain a passenger relative to the vehicle seat. The seat belt latch sensor may be integrated into a seat belt, seat belt buckle, or other features suitable for determining seat belt engagement. Optionally, the user may intentionally insert the seat belt to prevent remote seat folding operations.

One Block 66 may relate to determining the override event according to a status of a seat belt tension sensor used to sense tensioning on a seat belt used to restrain a passenger relative to the vehicle seat. The seat tension sensor may be integrated into a seat belt, seat belt buckle, or other features suitable for determining seat belt tensioning. Optionally, the user may intentionally tension the seat belt to prevent remote seat folding operations.

One Blocks 68-70 may relate to defining the override event override according to SMA protection logic used to protect operations of the SMA element, such as but not limited to thermal or electrical protection logic. The thermal and electrical protection logic may define any number of suitable or unsuitable operating parameters for the SMA element such that seat folding is permitted or prohibited as a function of the same. Various sensors may be needed to measure thermal and electrical operating parameters.

Returning to FIG. 2, Block 76 relates to determining the seat folding request to be from a nearby or non-remote location, such as but not limited to a location whereby visibility of the seat is possible. In response thereto, the seat actuation element may electronically control seat folding. Because the seat folding was instigated from a viewable location, this type of seat folding may be characterized as supervised seat folding.

Optionally, in response to determining the seat folding to be supervised, some or all of the above-identified override features may be ignored or bypassed during seat folding and/or that the user thereof may be required to apply constant pressure to the seat switch or fob in order to ignore the same, such as but not limited to confirming constant viewing of the seat. This may be helpful should one or more of the sensors fail or otherwise inappropriately prevent seat folding and/or to permit seat folding even if one of the override events is active, such as to facilitate seat folding when using the seat belt to restrain an object in the vehicle or any number of other conditions where it may be desirable to electronically fold the seat.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of folding a vehicle seat, the method comprising:
   receiving a remotely transmitted request for seat folding from a key fob;
   determining a proximity of the key fob to the vehicle;
   permitting unsupervised seat folding if the key fob is within a first proximity to the vehicle;
   requiring supervised seat folding if the key fob is within a second proximity to the vehicle;
   requiring one-touch seat actuation if unsupervised seating folding is permitted and requiring continuous seat actuation if supervised seating folding is permitted;
   requiring continuous manual depression of an electrical switch used in supervised seat folding if continuous seat actuation is required;
   overriding unsupervised seat folding in response to determining an override event such that supervised seat folding is required in order to fold the vehicle seat between the first and second positions; and
   defining the override event according to stability logic associated with preventing successive seat foldings within a predefined period of time.

2. The method of claim 1 further comprising determining the override event according to the stability logic associated with preventing successive seat foldings within the predefined period of time and a status of an obstruction sensor used to sense for obstructions on the vehicle seat.

3. The method of claim 1 further comprising determining the override event according to the stability logic associated with preventing successive seat foldings within the predefined period of time and a status of a seat fold travel sensor used to sense movement of the vehicle seat.

4. The method of claim 1 further comprising determining the override event according to the stability logic associated with preventing successive seat foldings within the predefined period of time and a status of a seat belt latch sensor used to sense engagement of a seat belt used to restrain a passenger relative to the vehicle seat.

5. The method of claim 1 further comprising determining the override event according to the stability logic associated with preventing successive seat foldings within the predefined period of time and a status of a seat belt tension sensor used to sense tensioning on a seat belt used to restrain a passenger relative to the vehicle seat.

6. The method of claim 1 wherein the vehicle seat includes a shape memory alloy (SMA) element configured to facilitate seat folding, and wherein the method further comprises defining the override event according to the stability logic associated with preventing successive seat foldings within the predefined period of time and SMA protection logic used to protect operations of the SMA element.

7. The method of claim 6 further comprising overriding the unsupervised seat folding according to SMA protection logic for thermal or electrical protection.

8. The method of claim 1 further comprising remotely actuating a secondary seat element associated with the vehicle seat before permitting one-touch seat folding.

9. The method of claim 8 wherein the secondary seat element is a temperature exchange element associated with heating or cooling the vehicle seat, the temperature exchange element being attached to the vehicle seat, and wherein the method further comprises shutting off the temperature exchange element before remotely actuating the secondary seat element.

10. The method of claim 1 further comprising defining the first proximity to correspond with a distance sufficient to visually inspect the vehicle seat.

11. A method of folding a vehicle seat, the method comprising:
    instigating folding of the vehicle seat upon receipt of a request from a key fob;
    determining a proximity of the key fob used to request folding the vehicle seat based on a signal received from the key fob;
    disabling an override of the seat folding if the key fob is within a first proximity; and
    requiring continuous-touch of the key fob or a vehicle seat switch to disable the override of the seat folding if the key fob is beyond the first proximity.

12. The method of claim 11 further comprising overriding seat folding in response to determining an override event, wherein the override event is defined according to stability logic associated which prevents successive seat foldings within a predefined period of time.

13. The method of claim 11 further comprising determining the key fob to be within the first proximity if the key fob is within three feet of the vehicle.

14. The method of claim 11 further comprising determining the key fob to be within the first proximity if the key fob is within five feet of a vehicle seat to be folded.

15. The method of claim 11 further comprising determining the override in the event a sensor senses the vehicle seat to be occupied, the override preventing folding of the seat.

16. A system for folding a vehicle seat, the system comprising:
    a key fob having a button to request seat folding;
    a seat actuation element configured to:
      (i) facilitate folding the seat upon receiving signals indicating actuation of the button;
      (ii) detect an override event;
      (iii) override folding the seat upon detecting the override event unless one of the button is actuated while the key fob is within a first distance to the vehicle and the button is continuously actuated while the key fob is at a second distance, beyond the first distance to the vehicle; and
    wherein the seat actuation element requires receipt of a signal from the key fob in order to determine whether the key fob is at each of the first and second distances.

17. The system of claim 16 wherein the override event is defined according to stability logic associated with preventing successive seat foldings within a predefined period of time.

18. The system of claim 17 further comprising a vehicle mounted seat switch and wherein the seat actuation element is configured to permit seat folding if the override event is determined and the seat switch is used to instigate seat folding.

19. The system of claim 16 wherein the first distance is approximately three feet.

* * * * *